United States Patent
Zhou et al.

(10) Patent No.: US 10,947,159 B2
(45) Date of Patent: Mar. 16, 2021

(54) GRANULATED BLAST-FURNACE SLAG ACTIVATOR, ITS MANUFACTURING METHOD THEREOF, AND MANUFACTURING METHOD OF CEMENT

(71) Applicant: Tangshan Polar Bear Building Materials Co., Ltd., Tangshan (CN)

(72) Inventors: Jian Zhou, Tangshan (CN); Zhifeng Chen, Tangshan (CN); Zhenqiu Zhang, Tangshan (CN); Zhongxi Ge, Tangshan (CN); Shujuan Zhang, Tangshan (CN); Qiao Chen, Tangshan (CN); Chengjian Liu, Tangshan (CN)

(73) Assignee: TANGSHAN POLAR BEAR BUILDING MATERIALS CO., LTD., Tangshan (CN)

( * ) Notice: Subject to any disclaimer, the term of this patent is extended or adjusted under 35 U.S.C. 154(b) by 26 days.

(21) Appl. No.: 16/360,536

(22) Filed: Mar. 21, 2019

(65) Prior Publication Data

US 2020/0299194 A1    Sep. 24, 2020

(51) Int. Cl.
*C04B 28/14* (2006.01)
*C04B 11/30* (2006.01)
*C04B 14/36* (2006.01)
*C04B 22/14* (2006.01)

(52) U.S. Cl.
CPC ............ *C04B 28/141* (2013.01); *C04B 11/30* (2013.01); *C04B 14/365* (2013.01); *C04B 22/145* (2013.01)

(58) Field of Classification Search
CPC ..... C04B 11/30; C04B 14/365; C04B 22/145; C04B 28/141; C04B 7/21; C04B 7/153; C04B 7/323; C04B 22/143; C04B 28/08; C04B 2111/00215
See application file for complete search history.

(56) References Cited

U.S. PATENT DOCUMENTS 9,850,168 B2 * 12/2017 Gartner ............... C04B 40/0032

FOREIGN PATENT DOCUMENTS

| CN | 1068558 | A | * | 2/1993 | ........... C04B 28/065 |
| CN | 1092747 | A | * | 9/1994 | ........... C04B 22/008 |
| CN | 102219422 | A | * | 10/2011 | ......... C04B 40/0039 |
| CN | 103342494 | A | * | 10/2013 | ........... C04B 28/065 |
| CN | 105110667 | A | * | 12/2015 | ........... C04B 22/008 |
| CN | 107827379 | A | * | 3/2018 | |
| CN | 108083671 | A | * | 5/2018 | |
| SU | 504722 | A1 | * | 2/1976 | |

* cited by examiner

*Primary Examiner* — Anthony J Green
(74) *Attorney, Agent, or Firm* — Billion & Armitage

(57) ABSTRACT

Provided are a granulated blast-furnace slag activator and a method of manufacturing the same. The granulated blast-furnace slag activator includes, in percent by weight, the following raw materials: 62% to 95% of gypsum and 5% to 38% of high belite sulfoaluminate cement clinker. Also provided is a method of manufacturing cement by mixing the granulated blast-furnace slag activator with granulated blast-furnace slag at a certain ratio.

19 Claims, No Drawings

GRANULATED BLAST-FURNACE SLAG ACTIVATOR, ITS MANUFACTURING METHOD THEREOF, AND MANUFACTURING METHOD OF CEMENT

TECHNICAL FIELD

The present disclosure relates to the technical field of building materials, and in particular to a granulated blast-furnace slag activator, its manufacturing method, and a method of manufacturing cement using the granulated blast-furnace slag activator.

BACKGROUND ART

At present, granulated blast-furnace slag is mostly activated by using a combined activation technique of alkaline activation and sulfate activation. Commonly used alkaline activators include lime, sodium hydroxide, water glass, cement clinker, sodium carbonate, etc.; and sulfate activators mainly include: $Na_2SO_4$, gypsum (including dihydrate gypsum, hemihydrate gypsum, anhydrite, calcined gypsum), and mirabilite. In general, when only a sulfate is added, it is very difficult to activate granulated blast-furnace slag. Only in a certain alkaline environment to which a certain amount of sulfate is then added, granulated blast-furnace slag can be well activated, and higher cementation strength can be obtained. In the presence of a sulfate, $SO_4^{2-}$ is chemically combined with active $Al_2O_3$ and hydrated calcium aluminate in granulated blast-furnace slag to produce hydrated calcium sulfoaluminate. As a result, a large amount of calcium and aluminum ions in the solution is consumed, which in turn accelerates the progress of hydration of the slag. The above two reactions advance each other. Sulfate-based activation is substantively of alkali-sulfate combined reaction.

The above-mentioned cementitious material, called "supersulfated cement", has good property characteristics such as low hydration heat, good impermeability, and excellent resistance to sulfate attack, and is featured as a simple production process, low cost, and low energy consumption. However, such cement has longer setting times, low early strength, and is prone to efflorescence, and it is, therefore, not widely used in China.

In addition, at present, the cracking of buildings is extremely common in China, which seriously affects the durability of buildings. Large shrinkage and low flexural (or bending) strength of cement-based materials are the main reasons. In the current situation where assemblization of buildings is being promoted in the state and mechanized assembly line for production has been performed in prefabrication factories, cement with high flexural strength is further needed.

Therefore, in order to improve the technical defects of the current supersulfated cement produced by using industrial waste residue and meet the requirements of various engineering constructions, it is urgently necessary to develop a technique for activating the reactivity of granulated blast-furnace slag, and to develop a new type of special cement having high early and long-term strengths, excellent durability, and low cost.

In view of the above, the present disclosure has been particularly presented.

SUMMARY

The present disclosure provides a granulated blast-furnace slag activator comprising, in percent by weight, the following raw materials: 62% to 95% of gypsum and 5% to 38% of high belite sulfoaluminate cement clinker.

The present disclosure also provides a method of manufacturing the above-mentioned granulated blast-furnace slag activator, comprising the steps of: grinding gypsum together with high belite sulfoaluminate cement clinker, optionally a mineral activation component and optionally a setting-accelerating and strength-enhancing component, to obtain the granulated blast-furnace slag activator.

The present disclosure also provides a method of manufacturing cement, comprising the step of mixing the above-mentioned granulated blast-furnace slag activator with granulated blast-furnace slag and activating the granulated blast-furnace slag.

DETAILED DESCRIPTION OF EMBODIMENTS

Embodiments of the present disclosure will be described in detail below in connection with examples, but it will be understood by those skilled in the art that the following examples are only intended to illustrate the present disclosure, and should not be considered as limiting the scope of the present disclosure. Examples are carried out in accordance with conventional conditions or conditions recommended by the manufacturer if no specific conditions are specified in the examples. Reagents or instruments used, whose manufacturers are not specified, are all conventional products that are commercially available.

One aspect of the present disclosure provides a granulated blast-furnace slag activator comprising, in percent by weight, the following raw materials: 62% to 95% of gypsum and 5% to 38% of high belite sulfoaluminate cement clinker.

In the present disclosure, the typical but non-limiting weight percentage of gypsum is, for example, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, or 95%; and the typical but non-limiting weight percentage of high belite sulfoaluminate cement clinker is, for example, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, or 38%.

When a sum of the weight percentages of both gypsum and high belite sulfoaluminate cement clinker is 100%, it is indicated that the granulated blast-furnace slag activator contains only two substances which are gypsum and high belite sulfoaluminate cement clinker; and when the sum of the weight percentages of both gypsum and high belite sulfoaluminate cement clinker is less than 100%, it is meant that the granulated blast-furnace slag activator comprises other components in addition to gypsum and high belite sulfoaluminate cement clinker.

In a preferred embodiment of the present disclosure, the above-mentioned granulated blast-furnace slag activator comprises, in percent by weight, the following raw materials: 65% to 90% of gypsum and 10% to 35% of high belite sulfoaluminate cement clinker. The characteristics of the activator can be further improved by further optimizing the composition of each raw material in the granulated blast-furnace slag activator, so that it can more effectively react with granulated blast-furnace slag. As a result, the effect of the granulated blast-furnace slag in a high-flexural-strength supersulfated cement is improved and the early strength and late strength of the high-flexural-strength supersulfated cement are increased.

In a preferred embodiment of the present disclosure, the high belite sulfoaluminate cement clinker comprises the following chemical compositions in percent by weight: 49% to 54% of calcium oxide, 12.9% to 17% of silicon dioxide, 12% to 19% of aluminum oxide, 0.15% to 3% of ferric oxide, and 12% to 18.5% of sulfur trioxide.

In the above-mentioned preferred embodiment, the typical but non-limiting weight percentage of calcium oxide is, for example, 49%, 50%, 51%, 52%, 53%, or 54%; the typical but non-limiting weight percentage of silicon dioxide is, for example, 12.9%, 13%, 13.2%, 13.4%, 13.5%, 13.7%, 14%, 14.2%, 14.4%, 14.6%, 14.8%, 15%, 15.3%, 15.6%, 15.9%, 16.2%, 16.5%, 16.8%, or 17%; the typical but non-limiting weight percentage of aluminum oxide is, for example, 12%, 13%, 14%, 15%, 16%, 17%, 18%, or 19%; the typical but non-limiting weight percentage of ferric oxide is, for example, 0.15%, 0.3%, 0.6%, 1%, 1.5%, 2%, 2.5%, or 3%; and the typical but non-limiting weight percentage of sulfur trioxide is, for example, 12%, 13%, 14%, 15%, 16%, 17%, 18%, or 18.5%.

In a preferred embodiment of the present disclosure, the high belite sulfoaluminate cement clinker comprises the following constituents: belite, calcium sulfoaluminate, tetracalcium aluminoferrite, calcium sulfate, and free lime; and preferably, the high belite sulfoaluminate cement clinker comprises the following constituents in percent by weight: 37% to 49% of belite, 20% to 37% of calcium sulfoaluminate, 0.4% to 9% of tetracalcium aluminoferrite, 6% to 26% of calcium sulfate, and 0.5% to 4.6% of free lime.

In the above-mentioned preferred embodiment, the typical but non-limiting weight percentage of belite is, for example, 37%, 39%, 41%, 43%, 45%, 47%, or 49%; the typical but non-limiting weight percentage of calcium sulfoaluminate is, for example, 20%, 22%, 25%, 27%, 30%, 33%, 35%, or 37%; the typical but non-limiting weight percentage of tetracalcium aluminoferrite is, for example, 0.4%, 0.7%, 1%, 2%, 3%, 5%, 7%, or 9%; the typical but non-limiting weight percentage of calcium sulfate is, for example, 6%, 10%, 13%, 15%, 18%, 20%, 22%, 25%, or 26%; and the typical but non-limiting weight percentage of free lime is, for example, 0.5%, 0.6%, 0.8%, 1%, 1.5%, 2%, 2.5%, 3%, 3.5%, 4%, 4.2%, 4.5%, or 4.6%.

In a preferred embodiment of the present disclosure, the granulated blast-furnace slag activator comprises, in percent by weight, 0.25% to 20% of a mineral activation component, and preferably, comprises, in percent by weight, 0.5% to 10% of the mineral activation component. The typical but non-limiting weight percentage of the mineral activation component is, for example, 0.25%, 0.5%, 0.7%, 1%, 2%, 5%, 8%, 12%, 14%, 16%, 18%, or 20%.

In a preferred embodiment of the present disclosure, the mineral activation component is one or more selected from the group consisting of Portland cement, Portland cement clinker, an ettringite-based expansive agent, a calcium oxide-based expansive agent, steel slag, and carbide slag. A typical but non-limiting choice is, for example, Portland cement, Portland cement clinker, an ettringite-based expansive agent, a calcium oxide-based expansive agent, steel slag, carbide slag, a combination of Portland cement and an ettringite-based expansive agent, a combination of Portland cement and a calcium oxide-based expansive agent, a combination of Portland cement and steel slag, a combination of an ettringite-based expansive agent and carbide slag, a combination of Portland cement clinker and an ettringite-based expansive agent, or a combination of Portland cement and an ettringite-based expansive agent and a calcium oxide-based expansive agent. The rate of dissolution of $Ca^{2+}$ and $AlO^{2-}$ from the granulated blast-furnace slag is further increased by adding a specific kind of mineral activation component.

In a preferred embodiment of the present disclosure, the granulated blast-furnace slag activator comprises, in percent by weight, 0.05% to 15% of a setting-accelerating and strength-enhancing component, and further preferably, comprises, in percent by weight, 0.05% to 8% of the setting-accelerating and strength-enhancing component. The typical but non-limiting weight percentage of the setting-accelerating and strength-enhancing component is, for example, 0.05%, 0.1%, 0.5%, 0.7%, 1%, 2%, 3%, 4%, 5%, 6%, 7%, 8%, 9%, 10%, 11%, 12%, 13%, 14%, or 15%.

In a preferred embodiment of the present disclosure, the setting-accelerating and strength-enhancing component is one or more selected from the group consisting of lithium hydroxide, lithium chloride, lithium carbonate, lithium sulfate, lithium silicate, sodium hydroxide, potassium hydroxide, calcium hydroxide, calcium oxide, sodium sulfate, potassium sulfate, aluminum sulfate, sodium carbonate, sodium bicarbonate, potassium carbonate, potassium bicarbonate, sodium chloride, and sodium silicate. A typical but non-limiting choice is, for example, lithium hydroxide, lithium chloride, lithium carbonate, lithium sulfate, lithium silicate, sodium hydroxide, potassium hydroxide, calcium hydroxide, calcium oxide, sodium sulfate, potassium sulfate, aluminum sulfate, sodium carbonate, sodium bicarbonate, potassium carbonate, potassium bicarbonate, sodium chloride, sodium silicate, a combination of lithium hydroxide and sodium hydroxide, a combination of lithium hydroxide and potassium hydroxide, a combination of lithium hydroxide and calcium hydroxide, a combination of lithium hydroxide and lithium sulfate, a combination of lithium hydroxide and aluminum sulfate, a combination of sodium hydroxide and potassium hydroxide, a combination of sodium hydroxide and calcium hydroxide, a combination of sodium hydroxide and lithium sulfate, a combination of sodium hydroxide and aluminum sulfate, a combination of calcium hydroxide and lithium sulfate, a combination of calcium hydroxide and aluminum sulfate, a combination of calcium hydroxide and sodium bicarbonate, a combination of lithium hydroxide and sodium hydroxide and potassium hydroxide, a combination of sodium hydroxide and potassium hydroxide and calcium hydroxide, a combination of sodium hydroxide and calcium hydroxide and aluminum sulfate, a combination of sodium hydroxide and calcium hydroxide and sodium bicarbonate, a combination of lithium hydroxide and sodium hydroxide and potassium hydroxide and calcium hydroxide, a combination of sodium hydroxide and calcium hydroxide and lithium sulfate and lithium sulfate, a combination of calcium hydroxide and lithium sulfate and sodium sulfate and aluminum sulfate, a combination of aluminum sulfate and lithium carbonate and sodium carbonate and sodium bicarbonate, a combination of lithium hydroxide and calcium hydroxide and lithium sulfate, a combination of lithium hydroxide and calcium hydroxide and aluminum sulfate and sodium bicarbonate, a combination of sodium hydroxide and calcium hydroxide and lithium sulfate and sodium bicarbonate, or a combination of potassium hydroxide and potassium carbonate and sodium sulfate and potassium bicarbonate and sodium silicate. The rate of dissolution of $Ca^{2+}$ and $AlO^{2-}$ from the granulated blast-furnace slag is further increased by adding a specific kind of setting-accelerating and strength-enhancing component.

In the above-mentioned preferred embodiment of the present disclosure, the reactivity of the granulated blast-furnace slag can be further activated by selectively adding the mineral activation component and/or the setting-accelerating and strength-enhancing component, thereby accelerating the hydration and hardening speeds of the cement and improving the early strength and long-term strength.

In a preferred embodiment of the present disclosure, the gypsum is one or more selected from the group consisting of natural dihydrate gypsum, natural anhydrite, hemihydrate gypsum, α-high-strength gypsum, desulfurization gypsum (also refers to flue gas desulfurization gypsum, FGD gypsum), phosphogypsum, and fluorogypsum.

In a preferred embodiment of the present disclosure, the high belite sulfoaluminate cement clinker is partially or wholly replaced by sulfoaluminate cement clinker; wherein 1 part by weight of the high belite sulfoaluminate cement clinker is replaced by 0.5 to 1 part by weight of sulfoaluminate cement clinker.

After the high belite sulfoaluminate cement clinker is partially replaced by sulfoaluminate cement clinker, the granulated blast-furnace slag activator comprises the following raw materials: gypsum, high belite sulfoaluminate cement clinker, and sulfoaluminate cement clinker, and preferably, the weight percentages of the above three may be as follows: gypsum 65% to 90%, high belite sulfoaluminate cement clinker 0.1% to 34.9%, and sulfoaluminate cement clinker 0.1% to 30%. Non-limitingly, granulated blast-furnace slag activator may consist of, in percent by weight, for example, 80% of gypsum, 15% of high belite sulfoaluminate cement clinker, and 5% of sulfoaluminate cement clinker.

After the high belite sulfoaluminate cement clinker is wholly replaced by sulfoaluminate cement clinker, non-limitingly, the granulated blast-furnace slag activator may consist of, in percent by weight, for example, 85% of gypsum and 15% of sulfoaluminate cement clinker.

In a preferred embodiment of the present disclosure, the high belite sulfoaluminate cement clinker is partially or wholly replaced by calcium aluminate cement clinker; wherein 1 part by weight of the high belite sulfoaluminate cement clinker is replaced by 0.2 to 0.5 parts by weight of calcium aluminate cement clinker.

After the high belite sulfoaluminate cement clinker is partially replaced by calcium aluminate cement clinker, the granulated blast-furnace slag activator comprises the following raw materials: gypsum, high belite sulfoaluminate cement clinker, and calcium aluminate cement clinker, and preferably, the weight percentages of the above three may be as follows: gypsum 65% to 90%, high belite sulfoaluminate cement clinker 0.1% to 34.9%, calcium aluminate cement clinker 0.1% to 15%. Non-limitingly, the granulated blast-furnace slag activator may consist of, in percent by weight, for example, 80% of gypsum, 18% of high belite sulfoaluminate cement clinker, and 2% of calcium aluminate cement clinker.

After the high belite sulfoaluminate cement clinker is wholly replaced by calcium aluminate cement clinker, non-limitingly, the granulated blast-furnace slag activator may consist of, in percent by weight, for example, 88% of gypsum and 12% of calcium aluminate cement clinker.

Another aspect of the present disclosure provides a method of manufacturing the above-mentioned granulated blast-furnace slag activator, comprising the steps of: grinding gypsum together with high belite sulfoaluminate cement clinker, optionally a mineral activation component and optionally a setting-accelerating and strength-enhancing component, to obtain the granulated blast-furnace slag activator.

In a preferred embodiment of the present disclosure, the granulated blast-furnace slag activator obtained after the grinding has a specific surface area of 380 $m^2$/kg to 700 $m^2$/kg. The high reactivity of the manufactured granulated blast-furnace slag activator can be achieved by adjusting the specific surface area of the granulated blast-furnace slag activator.

Yet another aspect of the present disclosure provides a method of manufacturing cement, comprising the step of mixing the above-mentioned granulated blast-furnace slag activator with granulated blast-furnace slag in a certain ratio and activating the granulated blast-furnace slag.

In an embodiment of the present disclosure, the granulated blast-furnace slag activator may be mixed with the granulated blast-furnace slag in a ratio by weight of 99:1 to 1:99, and preferably 99:1, 90:10, 80:20, 70:30, 60:40, 50:50, 40:60, 30:70, 20:80, 10:90, or 1:99.

In a preferred embodiment of the present disclosure, the granulated blast-furnace slag activator is mixed with the granulated blast-furnace slag in a ratio of 20:80 to manufacture cement.

The above-mentioned granulated blast-furnace slag activator can be used for the manufacture of high-flexural-strength supersulfated cement which is high in both early strength and long-term strength.

The present disclosure will be described in further detail below in connection with examples and comparative examples.

In the granulated blast-furnace slag activators provided in Examples 1-8, gypsum and high belite sulfoaluminate cement clinker are used in the same ratio, wherein 75% of gypsum and 25% of high belite sulfoaluminate cement clinker are comprised in percent by weight, and the difference is that the high belite sulfoaluminate cement clinkers have different mineral constituent compositions. The specific mineral constituents are listed in Table 1.

TABLE 1

Mineral Ingredient Compositions of High Belite Sulfoaluminate Cement Clinkers in Examples (Ex.) 1-8

| Mineral Ingredient | Ex. 1 | Ex. 2 | Ex. 3 | Ex. 4 | Ex. 5 | Ex. 6 | Ex. 7 | Ex. 8 |
|---|---|---|---|---|---|---|---|---|
| Belite | 19% | 46% | 43% | 37% | 38% | 45% | 39% | 46% |
| Calcium Sulfoaluminate | 63% | 27% | 42% | 32% | 29% | 28% | 30% | 35% |
| Tetracalcium Aluminoferrite | 10% | 18% | 8% | 7% | 5% | 6% | 8% | 1% |
| Calcium Sulfate | 4.7% | 6% | 5% | 19% | 20% | 16% | 20% | 10% |
| Free lime | 0.3% | 0.4% | 0.2% | 0.5% | 5% | 3% | 1% | 4% |
| Blended Mineral | 3% | 2.6% | 1.8% | 4.5% | 3% | 2% | 2% | 4% |

Here, each of the granulated blast-furnace slag activators in Examples 1-8 is manufactured by the following method: gypsum and high belite sulfoaluminate cement clinker are ground together to a powder having a specific surface area of 380 $m^2$/kg to 700 $m^2$/kg to obtain the granulated blast-furnace slag activator.

In the present disclosure, gypsum and high belite sulfoaluminate cement clinker in a specific mixing ratio are innovatively used as a granulated blast-furnace slag activator, which can be used for the preparation of high-flexural-strength supersulfated cement. In the present disclosure, an appropriate amount of free calcium sulfate and free lime in the high belite sulfoaluminate cement clinker is calcined at a low temperature of 1300° C.±50° C., and it has fine crystal, has a porous structure, and has higher reactivity, such that the granulated blast-furnace slag can be activated and the rate of dissolution of $Ca^{2+}$ and $AlO^{2-}$ therefrom can be improved, and subsequently the dissolved $Ca^{2+}$ and $AlO^{2-}$ react with gypsum to rapidly generate mineral ettringite with higher mechanical strength. Therefore, the combination of high belite sulfoaluminate cement clinker and gypsum according to the present disclosure can effectively activate the reactivity of granulated blast-furnace slag, fully exert the contribution of the granulated blast-furnace slag to the early and long-term mechanical properties of cement, and substantially accelerate the hydration and hardening of cement, thereby increase the early strength and the long-term strength, especially the flexural strength of cement, and effectively solve the problems of the current supersulfated cement such as having low early strength and efflorescence due to slow hydration and hardening. In addition, capillary pores of the cement paste are filled with the formed fine crystalline ettringite to form a dense matrix, which ensures excellent impermeability and durability of cement concrete.

High-flexural-strength supersulfated cements were manufactured by using the respective granulated blast-furnace slag activators provided in Examples 1-8 and granulated blast-furnace slag, and were recorded as Test Groups 1-8, respectively, in each of which the ratio of the granulated blast-furnace slag activator to the granulated blast-furnace slag was 20:80, the granulated blast-furnace slag used had the same properties and composition, and the preparation method was also the same. After the preparation was completed, the high-flexural-strength supersulfated cements in Test Groups 1-8 were made into cement mortar specimens, respectively, and various properties of the cement mortar specimen in each group were tested, respectively, and the test results were listed in Table 2.

TABLE 2

Test Results of Various Properties of Cement Mortar Specimens in Test Groups 1-8

| Property Parameter | 1-Day Compressive Strength/MPa | 3-Day Compressive Strength/MPa | 28-Day Compressive Strength/MPa | 90-Day Compressive Strength/MPa | 3-day Flexural Strength/MPa | 28-day Flexural Strength/MPa | 90-day Flexural Strength/MPa | Final Setting Time/min |
|---|---|---|---|---|---|---|---|---|
| Test Group 1 | 4.1 | 30.8 | 52.7 | 60.1 | 8.5 | 10.2 | 10.8 | 210 |
| Test Group 2 | 2.2 | 27.6 | 58.6 | 64.2 | 7.8 | 10.6 | 11.2 | 275 |
| Test Group 3 | 3.5 | 28.8 | 55.9 | 62.7 | 8.0 | 9.7 | 10.5 | 240 |
| Test Group 4 | 10.5 | 40.7 | 65.8 | 72.5 | 10.7 | 12.6 | 13.5 | 140 |
| Test Group 5 | 12.2 | 42.6 | 67.1 | 73.2 | 11.3 | 12.2 | 13.2 | 155 |
| Test Group 6 | 13.6 | 45.8 | 68.9 | 75.2 | 12.0 | 12.8 | 13.3 | 150 |
| Test Group 7 | 15.6 | 38.9 | 65.7 | 75.0 | 10.2 | 12.1 | 13.0 | 130 |
| Test Group 8 | 16.3 | 43.2 | 68.2 | 77.9 | 10.5 | 12.8 | 13.5 | 125 |

The granulated blast-furnace slag activators provided in Examples 9-11, in each of which the high belite sulfoaluminate cement clinker provided in Example 6 was used, were different in weight percentages of gypsum and the high belite sulfoaluminate cement clinker; and the granulated blast-furnace slag activators provided in Examples 12-20 comprised, in addition to gypsum and high belite sulfoaluminate cement clinker, different proportions of mineral activation components and/or setting-accelerating and strength-enhancing components, wherein the high belite sulfoaluminate cement clinker provided in Example 6 was also used in each of Examples 12-20. The specific ratio of gypsum to high belite sulfoaluminate cement clinker was listed in Table 3.

TABLE 3

Composition of Granulated Blast-furnace Slag Activators in Examples 9-20

| Activator Composition | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Gypsum | 70% | 85% | 90% | 73% | 76% | 65% | 70% | 62% | 87% | 80% | 83% | 85% |
| High Belite Sulfoaluminate Cement Clinker | 30% | 15% | 10% | 20% | 9% | 25% | 7% | 35% | 8% | 17% | 5% | 3% |
| Mineral Activation Component | / | / | / | 5% | / | 2% | 20% | 2.95% | 5% | 0.25% | 10% | 2% |
| Setting-accelerating and Strength-enhancing Component | / | / | / | 2% | 15% | 8% | 3% | 0.05% | / | 2.75% | 2% | 10% |

Here, each of the granulated blast-furnace slag activators in Examples 9-20 was manufactured by the following method: gypsum, high belite sulfoaluminate cement clinker, and the mineral activation component and/or the setting-accelerating and strength-enhancing component were ground together to a powder having a specific surface area of 400 $m^2$/kg to 700 $m^2$/kg to obtain the granulated blast-furnace slag activator.

Here, the mineral activation component used in Example 12 was Portland cement, and the mineral activation components used in Examples 14-20 were Portland cement clinker, an ettringite-based expansive agent, a calcium oxide-based expansive agent, steel slag, a combination of Portland cement and Portland cement clinker, a combination of Portland cement and an ettringite-based expansive agent, and a combination of an ettringite-based expansive agent and carbide slag, respectively. The setting-accelerating and strength-enhancing components used in Examples 12-16 were lithium hydroxide, a combination of lithium hydroxide and sodium hydroxide, a combination of lithium hydroxide and calcium hydroxide, a combination of lithium hydroxide and calcium hydroxide and lithium sulfate, and a combination of lithium hydroxide and calcium hydroxide and aluminum sulfate and sodium bicarbonate, respectively, and the setting-accelerating and strength-enhancing components used in Examples 18-20 were a combination of lithium hydroxide and lithium sulfate, a combination of lithium hydroxide and sodium hydroxide and potassium hydroxide, and a combination of potassium hydroxide and potassium carbonate and sodium sulfate and potassium bicarbonate and sodium silicate, respectively.

Comparative Example 1

This comparative example was a granulated blast-furnace slag activator in which only gypsum was used.

Comparative Example 2

This comparative example was a granulated blast-furnace slag activator in which only the high belite sulfoaluminate cement clinker provided in Example 6 was used.

Comparative Example 3

This comparative example was a granulated blast-furnace slag activator in which only Portland cement clinker and gypsum were used.

Comparative Example 4

This comparative example was a granulated blast-furnace slag activator comprising, in percent by weight, 50% of gypsum and 50% of the high belite sulfoaluminate cement clinker provided in Example 6.

Comparative Example 5

This comparative example was a granulated blast-furnace slag activator comprising, in percent by weight, 50% of gypsum, 48% of the high belite sulfoaluminate cement clinker provided in Example 6, and 2% of the mineral activation component in Example 12.

Comparative Example 6

This comparative example was a granulated blast-furnace slag activator comprising, in percent by weight, 50% of gypsum, 45% of the high belite sulfoaluminate cement clinker provided in Example 6, 3% of the mineral activation component in Example 12, and 2% of the setting-accelerating and strength-enhancing component in Example 14.

High-flexural-strength supersulfated cements were manufactured by using the respective granulated blast-furnace slag activators provided in Examples 9-20 and granulated blast-furnace slag, and were recorded as Test Groups 9-20, respectively; and then ordinary supersulfated cements were manufactured by using the respective granulated blast-furnace slag activators provided in Comparative Examples 1-6 and granulated blast-furnace slag, and were recorded as Control Groups 1-6, respectively; wherein in each of Test Groups 9-20 and Control Groups 1-6, the ratio of the granulated blast-furnace slag activator to the granulated blast-furnace slag was 20:80, the granulated blast-furnace slag used had the same properties and composition, and the preparation method was also the same. After the preparation was completed, the high-flexural-strength supersulfated cements in Test Groups 9-20 and the ordinary supersulfated cements in Control Groups 1-6 were made into cement mortar specimens, respectively, and various properties of the cement mortar specimen in each group were tested, respectively, and the test results were listed in Table 4.

TABLE 4

Test Results of Various Properties of Cement mortar specimens of Test Groups 9-20 and Control Groups 1-6

| Property Parameter | 1-Day Compressive Strength/MPa | 3-Day Compressive Strength/MPa | 28-Day Compressive Strength/MPa | 90-Day Compressive Strength/MPa | 3-Day Flexural StrengthMPa | 28-Day Flexural Strength/MPa | 90-Day Flexural Strength/MPa | Final Setting Time/min |
|---|---|---|---|---|---|---|---|---|
| Test Group 9 | 18.9 | 40.7 | 69.8 | 75.2 | 11.7 | 13.0 | 13.6 | 120 |
| Test Group 10 | 15.7 | 45.6 | 70.5 | 77.5 | 12.6 | 14.1 | 14.6 | 155 |
| Test Group 11 | 10.5 | 42.8 | 83.2 | 88.9 | 12.0 | 15.0 | 15.6 | 190 |
| Test Group 12 | 12.7 | 43.6 | 76.5 | 83.2 | 12.7 | 14.6 | 15.3 | 140 |
| Test Group 13 | 14.6 | 47.8 | 70.2 | 78.9 | 12.5 | 13.2 | 14.1 | 135 |
| Test Group 14 | 13.8 | 45.6 | 74.6 | 82.3 | 11.9 | 14.1 | 15.0 | 160 |
| Test Group 15 | 16.0 | 43.7 | 78.7 | 86.5 | 13.8 | 13.8 | 14.8 | 140 |
| Test Group 16 | 13.5 | 42.7 | 72.6 | 80.8 | 12.9 | 13.9 | 14.6 | 175 |
| Test Group 17 | 12.8 | 47.8 | 78.9 | 85.3 | 13.0 | 14.7 | 15.2 | 180 |
| Test Group 18 | 17.1 | 45.9 | 69.0 | 78.8 | 12.6 | 13.5 | 14.2 | 125 |
| Test Group 19 | 16.9 | 43.2 | 78.7 | 84.2 | 12.0 | 14.9 | 15.5 | 130 |
| Test Group 20 | 15.6 | 47.8 | 73.4 | 82.1 | 12.9 | 14.0 | 14.9 | 150 |
| Control Group 1 | None | None | None | None | None | None | None | Failed to Set |
| Control Group 2 | None | 6.3 | 25.9 | 33.7 | 3.8 | 6.5 | 7.4 | 350 |
| Control Group 3 | None | 8.2 | 38.6 | 48.1 | 2.7 | 7.7 | 8.0 | 1560 |
| Control Group 4 | None | 17.6 | 36.8 | 45.3 | 3.5 | 7.2 | 7.9 | 360 |
| Control Group 5 | None | 16.5 | 40.2 | 48.7 | 3.7 | 6.9 | 7.5 | 350 |
| Control Group 6 | None | 19.2 | 41.8 | 50.1 | 4.0 | 7.8 | 8.6 | 335 |

The compressive strength of the high-flexural-strength supersulfated cement manufactured by using the granulated blast-furnace slag activator according to the present disclosure has a change rule equivalent to that of Portland cement 52.5R, and the 1-day compressive strength reaches 18 MPa, the 3-day compressive strength exceeds 40 MPa, and the 28-day compressive strength is up to 80 MPa or more, which is much higher than that of the ordinary Portland cement. The high-flexural-strength supersulfated cement manufactured by using the granulated blast-furnace slag activator according to the present disclosure has a flexural resistance significantly superior to the prior types of cement, has a 28-day flexural strength of up to 15 MPa, has the characteristic of high flexural strength, and can effectively reduce the cracking of concrete. In addition, the long-term strength of the high-flexural-strength supersulfated cement according to the present disclosure is not reduced but is slightly increased, and it can be seen from the experimental data that the 90-day compressive strength is increased by 5 to 10 MPa compared with the 28-day compressive strength, and the flexural strength is increased by 0.5 to 1.0 MPa.

The hydration and hardening of cement can be greatly accelerated by using the granulated blast-furnace slag activator according to the present disclosure, the final setting time of the cement can therefore be shortened effectively. In the present technology, the final setting time of the high-flexural-strength supersulfated cement is 120 to 200 minutes, which meets the provision of the National Standard GB 175 that the final setting time of Portland cement shall not exceed 390 minutes.

The granulated blast-furnace slag activators provided in Examples 21-25 each comprise gypsum, high belite sulfoaluminate cement clinker and/or sulfoaluminate cement clinker, and optionally a mineral activation component and optionally a setting-accelerating and strength-enhancing component, and are different in weight percentage of each raw material. Here, the high belite sulfoaluminate cement clinker provided in Example 6 is used in each of Examples 21-25. The specific contents of the respective raw materials are listed in Table 5.

TABLE 5

Composition of Raw Materials Used in Examples 21-25

| Activator Composition | Example 21 | Example 22 | Example 23 | Example 24 | Example 25 |
|---|---|---|---|---|---|
| Gypsum | 77% | 85% | 75% | 70% | 77% |
| High Belite Sulfoaluminate Cement Clinker | 15% | 0% | 13% | 11% | 0% |
| Sulfoaluminate Cement Clinker | 8% | 15% | 7% | 7% | 17% |
| Mineral Activation Component | 0% | 0% | 4.5% | 12% | 4% |
| Setting-accelerating and Strength-enhancing Component | 0% | 0% | 0.5% | 0 | 2% |

The granulated blast-furnace slag activators provided in Examples 26-30 each comprise gypsum, high belite sulfoaluminate cement clinker and/or calcium aluminate cement clinker, and optionally a mineral activation component and optionally a setting-accelerating and strength-enhancing component, and are different in weight percentage of each raw material. Here, the high belite sulfoaluminate cement clinker provided in Example 6 is used in each of Examples 26-30. The specific contents of the respective raw materials are listed in Table 6.

TABLE 6

Composition of Raw Materials Used in Examples 26-30

| Activator Composition | Example 26 | Example 27 | Example 28 | Example 29 | Example 30 |
|---|---|---|---|---|---|
| Gypsum | 80% | 88% | 76% | 70% | 83% |
| High Belite Sulfoaluminate Cement Clinker | 15% | 0% | 10% | 15% | 0% |
| Calcium Aluminate Cement Clinker | 5% | 12% | 5% | 6% | 10% |
| Mineral Activation Component | 0% | 0% | 5.5% | 9% | 5% |
| Setting-accelerating and Strength-enhancing Component | 0% | 0% | 3.5% | 0 | 2% |

Since the granulated blast-furnace slag activator according to the present disclosure has higher reactivity, the amount of the activator used can be remarkably reduced, and it is suggested by tests that in supersulfated cement manufactured by using the granulated blast-furnace slag activator according to the present disclosure, granulated blast-furnace slag may be present in a proportion by weight of about 90%, therefore the rate of utilization of the granulated blast-furnace slag can be substantially improved, the manufacturing cost of the high-flexural-strength supersulfated cement can be reduced, thereby the problems such as resource shortage, high production cost and large carbon emission can be effectively solved, and energy saving and consumption reduction are finally achieved.

Since the granulated blast-furnace slag activator according to the present disclosure can activate high reactivity of a granulated blast-furnace slag powder with low fineness, it is unnecessary to perform ultra-fine grinding of the granulated blast-furnace slag, thereby greatly reducing the energy consumed by the grinding and improving the production efficiency.

High-flexural-strength supersulfated cements were manufactured by using the respective granulated blast-furnace slag activators provided in Examples 21-30 and granulated blast-furnace slag, and were recorded as Test Groups 21-30, respectively; wherein in each of Test Groups 21-30, the ratio of the granulated blast-furnace slag activator to the granulated blast-furnace slag was 20:80, the granulated blast-furnace slag used had the same properties and composition, and the preparation method was also the same. After the preparation was completed, the high-flexural-strength supersulfated cements e in Test Groups 21-30 were made into cement mortar specimens, respectively, and various properties of the cement mortar specimen in each group were tested, respectively, and the test results were listed in Table 7.

TABLE 7

Test Results of Various Properties of Cement mortar specimens of Test Groups 21-30

| Property Parameter | 1-Day Compressive Strength/MPa | 3-Day Compressive Strength/MPa | 28-Day Compressive Strength/MPa | 3-Day Flexural Strength/MPa | 28-Day Flexural Strength/MPa | Final Setting Time/min |
|---|---|---|---|---|---|---|
| Test Group 21 | 10.3 | 36.7 | 75.8 | 11.5 | 14.3 | 180 |
| Test Group 22 | 11.5 | 32.8 | 80.5 | 11.2 | 15.0 | 190 |
| Test Group 23 | 12.7 | 40.8 | 72.5 | 12.8 | 14.5 | 165 |
| Test Group 24 | 14.3 | 43.7 | 76.4 | 11.6 | 13.9 | 150 |
| Test Group 25 | 12.5 | 45.2 | 70.3 | 11.9 | 14.2 | 155 |
| Test Group 26 | 11.6 | 38.5 | 83.7 | 10.8 | 15.2 | 185 |
| Test Group 27 | 10.5 | 32.9 | 85.2 | 10.3 | 14.9 | 195 |
| Test Group 28 | 15.0 | 42.9 | 76.5 | 12.5 | 13.8 | 155 |
| Test Group 29 | 14.2 | 48.5 | 72.1 | 11.9 | 14.1 | 140 |
| Test Group 30 | 16.5 | 47.0 | 75.1 | 13.0 | 14.8 | 165 |

In the granulated blast-furnace slag activators provided in Examples 31-38, gypsum and high belite sulfoaluminate cement clinker are used in the same ratio, wherein 75% of gypsum and 25% of high belite sulfoaluminate cement clinker are comprised in percent by weight, and the difference is that the high belite sulfoaluminate cement clinkers have different chemical compositions, wherein the chemical composition inevitably contains some blended chemical ingredients, the blended chemical ingredient includes any one or a combination of at least two of $MgO$, $TiO_2$, $Na_2O$, and $K_2O$, and the weight percentage of the blended chemical ingredient is ≤4%. The specific chemical compositions are listed in Table 8.

TABLE 8

Chemical Compositions of High Belite Sulfoaluminate Cement Clinkers in Examples 31-38

| Chemical Composition | Example 31 | Example 32 | Example 33 | Example 34 | Example 35 | Example 36 | Example 37 | Example 38 |
|---|---|---|---|---|---|---|---|---|
| Calcium Oxide | 60% | 58% | 49.0% | 50.0% | 51.0% | 52.0% | 53.0% | 54.0% |
| Silicon Dioxide | 20% | 14% | 17.0% | 16.0% | 15.0% | 12.9% | 13.5% | 14.0% |
| Aluminum Oxide | 10% | 23% | 12.3% | 19.0% | 16.5% | 14.2% | 14.0% | 12.0% |
| Ferric Oxide | 5% | 0.1% | 3.0% | 0.15% | 1.0% | 2.2% | 1.2% | 2.1% |
| Sulfur Trioxide | 3.0% | 0.4% | 15.0% | 12.0% | 13.5% | 17.6% | 16.3% | 15.4% |
| Blended Chemical Ingredient | 2.0% | 4.0% | 3.7% | 2.8% | 3.0% | 1.1% | 2% | 3% |

High-flexural-strength supersulfated cements were manufactured by using the respective granulated blast-furnace slag activators provided in Examples 31-38 and granulated blast-furnace slag, and were recorded as Test Groups 31-38, respectively, in each of which the ratio of the granulated blast-furnace slag activator to the granulated blast-furnace slag was 20:80, the granulated blast-furnace slag used had the same properties and composition, and the preparation method was also the same. After the preparation was completed, the high-flexural-strength supersulfated cements in Test Groups 31-38 were made into cement mortar specimens, respectively, and various properties of the cement mortar specimen in each group were tested, respectively, and the test results were listed in Table 9.

TABLE 9

Test Results of Various Properties of Cement mortar specimens in Test Groups 31-38

| Property Parameter | 1-Day Compressive Strength/MPa | 3-Day Compressive Strength/MPa | 28-Day Compressive Strength/MPa | 3-Day Flexural Strength/MPa | 28-Day Flexural Strength/MPa | Final Setting Time/min |
|---|---|---|---|---|---|---|
| Test Group 31 | 3.0 | 29.6 | 42.7 | 8.2 | 9.3 | 255 |
| Test Group 32 | 4.2 | 28.2 | 48.3 | 7.3 | 9.6 | 265 |
| Test Group 33 | 10.2 | 40.8 | 70.7 | 10.1 | 12.1 | 150 |
| Test Group 34 | 13.0 | 43.9 | 78.6 | 13.0 | 14.7 | 165 |
| Test Group 35 | 13.1 | 42.7 | 75.4 | 13.0 | 13.9 | 170 |
| Test Group 36 | 14.2 | 47.0 | 70.2 | 12.5 | 13.8 | 145 |
| Test Group 37 | 13.7 | 40.5 | 80.1 | 12.2 | 15.0 | 150 |
| Test Group 38 | 12.6 | 43.2 | 73.8 | 12.1 | 13.9 | 160 |

The granulated blast-furnace slag activator according to the present disclosure provides a new technical idea for actively developing special cement, improving the characteristics of special cement, and improving the technical defects of the current supersulfated cement, and the granulated blast-furnace slag activator can be utilized to manufacture special cement which meets the requirements of various engineering constructions.

While the present disclosure has been illustrated and described with specific examples, it will be appreciated that many other variations and modifications can be made without departing from the spirit and scope of the present disclosure. Therefore, it is intended that all these variations and modifications falling within the scope of the present disclosure should be included in the appended claims.

INDUSTRIAL APPLICABILITY

The granulated blast-furnace slag activator according to the present disclosure provides a new technical idea for actively developing special cement, improving the characteristics of special cement, and improving the technical defects of the current supersulfated cement, and the granulated blast-furnace slag activator can be utilized to manufacture special cement which meets the requirements of various engineering constructions.

The invention claimed is:

1. A granulated blast-furnace slag activator, comprising, in percent by weight, following raw materials: 62% to 95% of gypsum and 5% to 38% of high belite sulfoaluminate cement clinker.

2. The granulated blast-furnace slag activator according to claim 1, comprising, in percent by weight, following raw materials: 65% to 90% of gypsum and 10% to 35% of high belite sulfoaluminate cement clinker.

3. The granulated blast-furnace slag activator according to claim 1, wherein the high belite sulfoaluminate cement clinker comprises following chemical compositions in percent by weight: 49% to 54% of calcium oxide, 12.9% to 17% of silicon dioxide, 12% to 19% of aluminum oxide, 0.15% to 3% of ferric oxide, and 12% to 18.5% of sulfur trioxide.

4. The granulated blast-furnace slag activator according to claim 2, wherein the high belite sulfoaluminate cement clinker comprises following chemical compositions in percent by weight: 49% to 54% of calcium oxide, 12.9% to 17% of silicon dioxide, 12% to 19% of aluminum oxide, 0.15% to 3% of ferric oxide, and 12% to 18.5% of sulfur trioxide.

5. The granulated blast-furnace slag activator according to claim 1, wherein the high belite sulfoaluminate cement clinker comprises following mineral constituents: belite, calcium sulfoaluminate, tetracalcium aluminoferrite, calcium sulfate, and free lime.

6. The granulated blast-furnace slag activator according to claim 2, wherein the high belite sulfoaluminate cement clinker comprises following mineral constituents: belite, calcium sulfoaluminate, tetracalcium aluminoferrite, calcium sulfate, and free lime.

7. The granulated blast-furnace slag activator according to claim 5, wherein the high belite sulfoaluminate cement clinker comprises following mineral constituents in percent by weight: 37% to 49% of belite, 20% to 37% of calcium sulfoaluminate, 0.4% to 9% of tetracalcium aluminoferrite, 6% to 26% of calcium sulfate, and 0.5% to 4.6% of free lime.

8. The granulated blast-furnace slag activator according to claim 6, wherein the high belite sulfoaluminate cement clinker comprises the following mineral constituents in percent by weight: 37% to 49% of belite, 20% to 37% of calcium sulfoaluminate, 0.4% to 9% of tetracalcium aluminoferrite, 6% to 26% of calcium sulfate, and 0.5% to 4.6% of free lime.

9. The granulated blast-furnace slag activator according to claim 1, comprising, in percent by weight, 0.25% to 20% of a mineral activation component.

10. The granulated blast-furnace slag activator according to claim 9, comprising, in percent by weight, 0.5% to 10% of the mineral activation component.

11. The granulated blast-furnace slag activator according to claim 9, wherein the mineral activation component is one or more selected from a group consisting of Portland cement, Portland cement clinker, an ettringite-based expansive agent, a calcium oxide-based expansive agent, steel slag, and carbide slag.

12. The granulated blast-furnace slag activator according to claim 1, comprising, in percent by weight, 0.05% to 15% of a setting-accelerating and strength-enhancing component.

13. The granulated blast-furnace slag activator according to claim 12, comprising, in percent by weight, 0.05% to 8% of the setting-accelerating and strength-enhancing component.

14. The granulated blast-furnace slag activator according to claim 12, wherein the setting-accelerating and strength-enhancing component is one or more selected from a group consisting of lithium hydroxide, lithium chloride, lithium carbonate, lithium sulfate, lithium silicate, sodium hydroxide, potassium hydroxide, calcium hydroxide, calcium oxide, sodium sulfate, potassium sulfate, aluminum sulfate, sodium carbonate, sodium bicarbonate, potassium carbonate, potassium bicarbonate, sodium chloride, and sodium silicate.

15. The granulated blast-furnace slag activator according to claim 1, wherein the gypsum is one or more selected from a group consisting of natural dihydrate gypsum, natural anhydrite, hemihydrate gypsum, α-high-strength gypsum, desulfurization gypsum, phosphogypsum, and fluorogypsum.

16. The granulated blast-furnace slag activator according to claim 2, wherein the gypsum is one or more selected from a group consisting of natural dihydrate gypsum, natural anhydrite, hemihydrate gypsum, α-high-strength gypsum, desulfurization gypsum, phosphogypsum, and fluorogypsum.

17. A method of manufacturing a granulated blast-furnace slag activator according to claim 1, comprising following steps of: grinding gypsum together with high belite sulfoaluminate cement clinker, optionally a mineral activation component and optionally a setting-accelerating and strength-enhancing component, to obtain the granulated blast-furnace slag activator.

18. The method of manufacturing a granulated blast-furnace slag activator according to claim 17, wherein the granulated blast-furnace slag activator obtained after the grinding has a specific surface area of 380 $m^2$/kg to 700 $m^2$/kg.

19. A method of manufacturing cement, comprising a step of mixing a granulated blast-furnace slag activator according to claim 1 with granulated blast-furnace slag and activating the granulated blast-furnace slag.

* * * * *